United States Patent [19]

Newell

[11] Patent Number: 4,831,359
[45] Date of Patent: May 16, 1989

[54] FOUR QUADRANT TOUCH PAD

[75] Inventor: Darrel E. Newell, Bayport, Minn.

[73] Assignee: Micro Research, Inc., Bayport, Minn.

[21] Appl. No.: 144,550

[22] Filed: Jan. 13, 1988

[51] Int. Cl.[4] .............................................. G01S 5/16
[52] U.S. Cl. ...................................... 341/5; 340/709; 250/229
[58] Field of Search .............. 340/365 P, 365 R, 709; 250/229; 178/18

[56] References Cited

U.S. PATENT DOCUMENTS

| | | | |
|---|---|---|---|
| 4,607,159 | 8/1986 | Goodson et al. | 250/229 |
| 4,641,026 | 2/1987 | Garcia, Jr. | 340/365 P |
| 4,748,323 | 5/1988 | Holiday | 250/229 |

OTHER PUBLICATIONS

"Optical Keyboard" by H. Matino, IBM Tech. Discl. Bulletin, vol. 20, No. 2, Jul. 1977.

Primary Examiner—John W. Caldwell, Sr.
Assistant Examiner—Tyrone Queen
Attorney, Agent, or Firm—Orrin M. Haugen; Thomas J. Nikolai; Frederick W. Niebuhr

[57] ABSTRACT

A manually operable touch pad for generating steering signals and enable signals for manipulating an image on a CRT display or for controlling the operation of plural motors whereby the image or object being driven can be positioned using appropriate hand/eye coordination. The touch pad comprises a box-like mounting base supporting a rectangular printed circuit board on which are mounted four opto-switches centered on the respective edges thereof. The printed circuit board also supports other circuit components and the necessary interconnecting conductors. Overlaying the base in covering relation with respect to the printed circuit board is a molded plastic top having a center post which depends downwardly from the underside thereof, passing through an apertrue in the printed circuit card and adaptive to be secured to the center of the base by a flexible coupling. Depending downwardly from the underside of the cover are four opaque projections positioned to selectively interrupt the passage of light energy in the four opto-switches. By manipulating the top member, it can be rocked in such a way that the trigger tabs can appropriately actuate the opto-switches and thereby produce the desired control signals.

10 Claims, 2 Drawing Sheets

FOUR QUADRANT TOUCH PAD

BACKGROUND OF THE INVENTION

I. Field of the Invention:

This invention relates generally to electromechanical switching apparatus and more particularly to a four quadrant touch pad useful in generating control signals for a motor or other electrical or electronic devices for moving or positioning an imager or object.

II. Discussion of the Prior Art:

Various electromechanical devices are known in the art for effecting steering of an image or object by producing control signals in accordance with the manner in which the device in question is manipulated. For example, so-called "joy-sticks" are frequently used with computing equipment to cause movement of a cursor or other image on the face of a CRT monitor. A typical joy-stick operates by producing control signals by means of electrical potentiometers linked to the movable actuating rod where the magnitude of the signal determines rate of motion and the polarity of the signal signifies direction, e.g., up, down, left and right.

Another well-known device is the so-called "track-ball". In this arrangement, a spherical member is journaled for rotation about any axis within a socket and a portion of the spherical surface of the ball projects outwardly from the socket. By suitable rotation of the ball, control signals are developed for directing the motion of an image or an object depending upon the equipment with which the track-ball device is used.

Another known device is the so-called "touch pad". In known prior art arrangements, a printed circuit board having a pattern of conductors formed in a grid of a predetermined spacing is juxtaposed with a flexible plastic insulating layer having a pattern of metallization on the under surface thereof. A spacer layer may be disposed between the two. By depressing the flexible layer against the underlying printed circuit grid, signals are produced which are directly related to the particular point on the pad where it is being touched.

One problem with the above-described prior art devices is that they are subject to failure due to mechanical wear. Moreover, in the case of the diaphragm-type touch pad mentioned above, within a short time, the flexible outer layer may be permanently distorted, rendering the device inoperable.

OBJECTS

It is accordingly a principal object of the present invention to provide a four quadrant touch pad which is less subject to mechanical wear and resulting failure.

Another object of the invention is to provide a four quadrant touch pad wherein the switching point remains extremly precise and clean thoughout long periods of use.

Still another object of the invention is to provide a four quadrant touch pad which is human-engineered so that it is capable of being operated by one hand in a very easy and natural motion.

Yet another object of the invention is to provide a four quadrant touch pad having a simple mechanical design and which is readily adaptable to both external or internal mounting.

A still further object of the invention is to provide a four quadrant touch pad wherein the actuation pressure is independent of the switch function and can be readily adjusted to suit the desires of the operator.

SUMMARY OF THE INVENTION

The foregoing advantages of the invention are achieved by providing a box-like mounting base having a rectangular bottom and four mutually perpendicular side walls. Supported by stand-offs attached to the base is a rigid printing circuit board having a pattern of etched conductors formed thereon for interconnecting various circuit components including a set of four opto-switches located centrally along the four side edges of the board. The opto-switches comprise a block-like housing having a channel extending inwardly from the top surface thereof and positioned on opposite sides of the channel are the photo-diode and photo-transistor comprising the opto-switch.

Disposed above the printed circuit board and in covering relation relative thereto is a touch-pad in the form of a molded rigid plastic plate having a center post projecting downwardly from the under surface thereof and which is adapted to fit through a circular opening formed centrally on the printed circuit board. The post is internally threaded so that it can be resiliently attached to the bottom of the box-like base by a screw-type fastener extending through a deformable washer. Also projecting downwardly from the edges of the cover are opaque tabs which are positioned so as to fit into the channels on the opto-switches when the cover is manually rocked about the center post.

Finally, there is disposed between the upper surface of the printed circuit board and the under surface of the touch pad resilient, elastomeric spacer blocks which control the "feel" of the touch pad as it is being manipulated by the user and which act as a return spring when hand pressure is removed from the touch pad.

The opto-switches are arranged to be powered by a source of DC voltage which may be applied via an edge connector to the on-board circuitry and this edge connector may be used to couple the touch pad's output lines to the external circuitry.

The foregoing features and advantages of the invention will become more apparent to those skilled in the art from the following detailed description of a preferred embodiment, especially when considered in conjunction with the accompanying drawings in which like numerals in the several views refer to corresponding parts.

DISCUSSION OF THE PREFERRED EMBODIMENT

Figure 1:
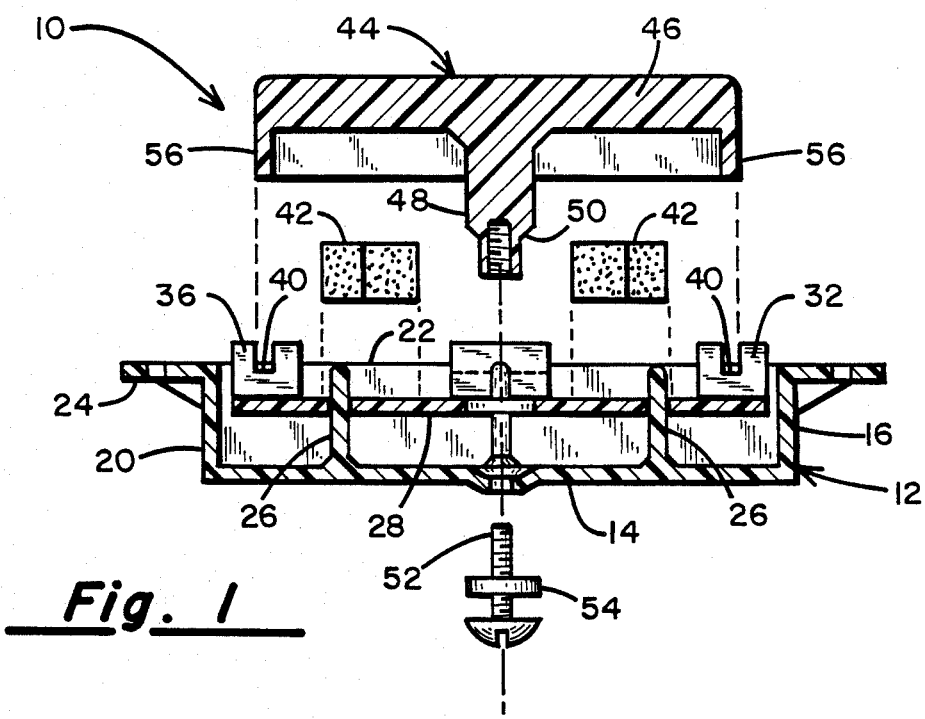
FIG. 1 is a side cross-sectional view, in blow-apart form, showing the constructional features of the four quadrant touch pad comprising the preferred embodiments.

Referring to FIG. 1, the four quadrant touch pad comprising the preferred embodiment is indicated generally by numeral 10 and is seen to include a molded plastic base member 12 in the form of a generally rectangular and preferably square box having a bottom wall 14 and four mutually perpendicular side walls 16 through 22. To facilitate mounting the assembly in a control panel or the like integrally formed, laterally extending mounting flanges 24 are also formed on the box-like base 12.

Figure 2:
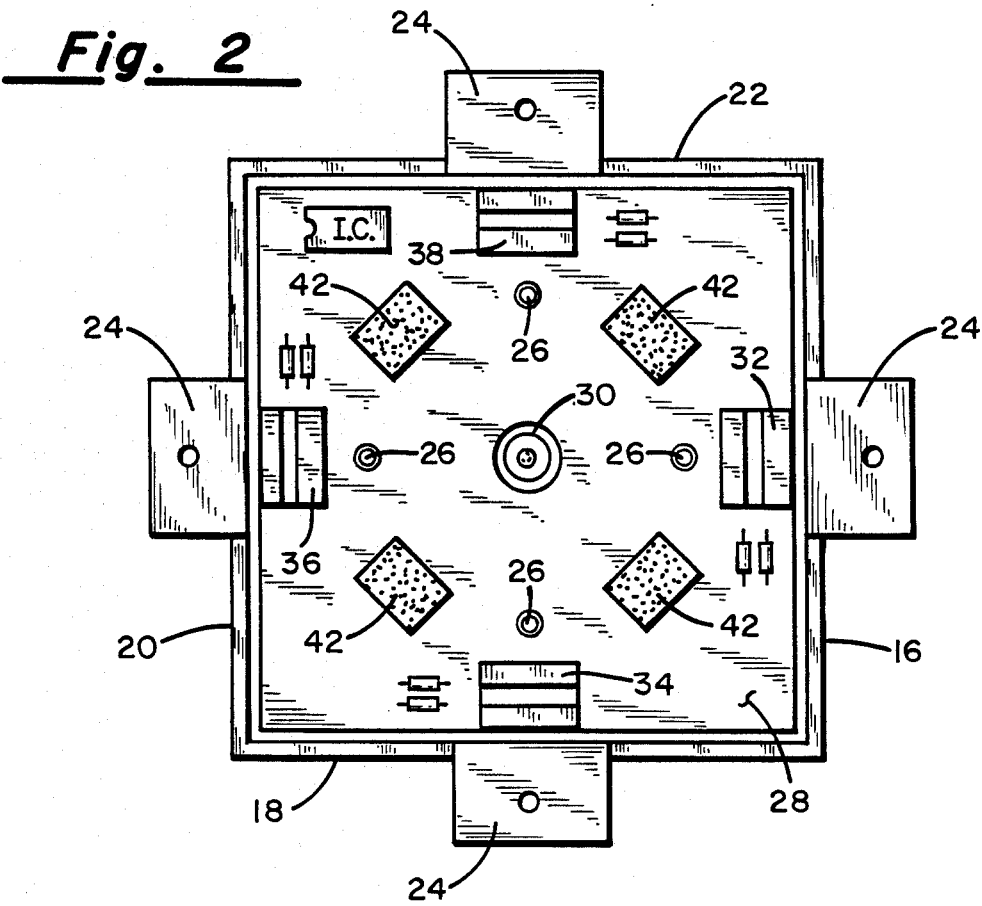
FIG. 2 is a plan view of the assembly of FIG. 1.

As can best be seen in FIG. 2, projecting upwardly from the inner surface of the bottom wall 14 are pin-like posts 26 which are arranged in pairs along two mutually perpendicular axes that intersect at the center of the base. The post 26 support a rigid printed circuit board 28 having a pattern of printed wiring formed in an etching or deposition process on one or both surfaces thereof. More specifically, the printed circuit board 28 is also generally rectangular and dimensioned to fit within the walls of the box-like base 12. This is accomplished by providing apertures through the board 28 allowing the pins 26 to pass therethrough. In this manner, positive positional registration is maintained between the printed circuit board 28 and the base 12. The printed circuit board 28 also has a central aperture 30 passing therethrough.

Figure 3:
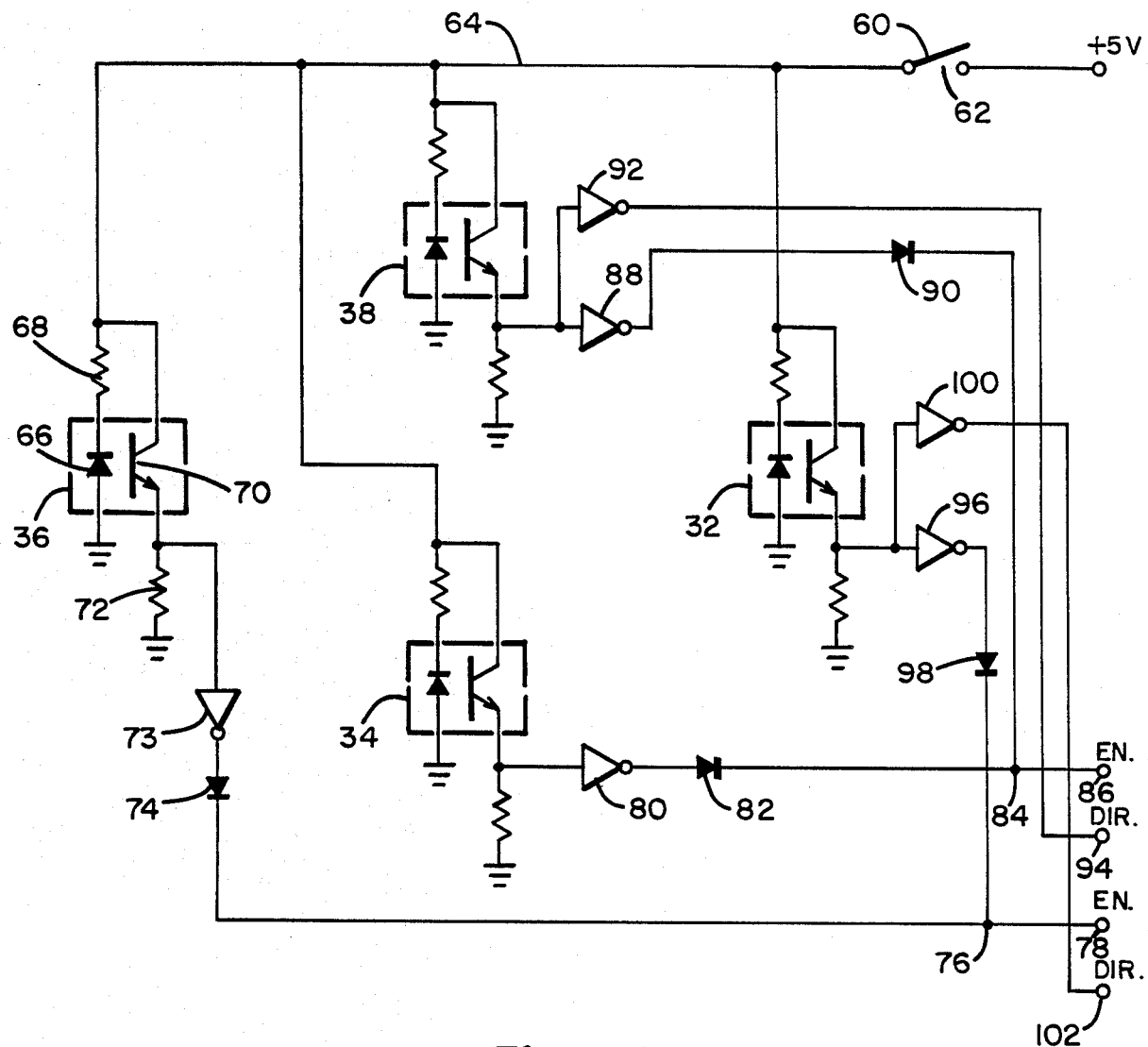
FIG. 3 is an electrical schematic diagram of the circuitry employed in implementing the preferred embodiment.

The printed wiring on the board 28 provides the means whereby the various electrical components shown in the schematic diagram of FIG. 3 are interconnected. Included among these components are four opto-switch devices 32, 34, 36 and 38 which are respectively disposed at the side edges of the printed circuit board along the perpendicular bisectors of the sides. Each of the opto-switches comprises a block of transparent plastic containing a radiation source, such as a LED, and a photosensor. A groove or channel 40 is formed inwardly from a top surface thereof, the channel extending parallel to the respective side edges of the printed circuit board 28 and passing between the LED and the phototransistor.

Also positioned on the upper surface of the printed circuit board 28 are four resilient spacers, as at 42, which may comprise a pad of elastomeric material of a predetermined durometer. These spacer blocks 42 are dimensioned so as to maintain a desired spacing between the printed circuit board 28 and touch panel member 44.

The touch panel member 44 also comprises a rigid molded plastic rectangular plate 46 having a center post 48 integrally formed therewith and extending downwardly from the under surface thereof. As can be seen in FIG. 1, the center post is chamfered at 50 to a lesser diameter terminal portion which is dimensioned to fit through the opening 30 formed in the printed circuit board and is internally threaded to receive a connecting screw 52 inserted upward through a hole formed in the bottom 14 of the base 12. A resilient rubber washer 54 is fitted over the screw and thus allows the touch panel member 44 to be rocked within the opening 30 form forward in the printed circuit card 28.

Also extending downwardly from the side edges of the plate 46 are light-obstructing tabs 56. The dimensions of the plate 46 are such that the tabs 56 will be poised directly above the channels 40 formed in the opto-switches 32 through 38, the spacing being maintained by the resilient pads 42.

When pressure is applied off-center to the upper surface of the plate 46 to rock it about the centerpost, one or more of the opaque, light-obstructing tabs 56 will be moved downward into the channel 40 of its associated opto-switch, blocking the transmission of light from the light-emitting diode source to the photo-transistor sensor. When pressure is removed, the resiliency of the spacers 42 and the rubber washer 54 will again cause the touch panel 44 to move upwardly and removing the opaque tabs 56 from the channel in the opto-switch block, allowing light from the source to reach the sensor.

With reference to FIG. 2, if the hand pressure is applied at the 0, 90, 180 or 270 degree locations, only the opto-switch associated with that particular location will be affected. By applying pressure, for example, in the northeast quadrant, opto-switches 32 and 38 will be simultaneously actuated. Likewise, if the pressure is applied in the southwest quadrant, it will be opto-switches 34 and 36 that will be simultaneously affected.

Referring now to FIG. 3, the electrical schematic diagram of the four quadrant touch panel is presented. The circuitry is adapted to be energized by a source of DC voltage, e.g., +5 volts applied to a terminal 60 through a on/off switch 62. The terminal 60 is connected to a bus 64 to which each of the opto-switches 32, 34, 36 and 38 are connected. More particularly, each of the opto-switches includes a LED 66 which is connected in series with a current limiting resistor 68 between ground and the bus 64. Each opto-switch also includes a photo-transistor 70 having its collector electrode connected to the bus 64 and its emitter electrode coupled through a resistor 72 to ground.

The output from the opto-switch is obtained at the emitter electrode of the photo-transistor 70 and, in the case of opto-switch 36, that signal is fed through an inverter 73 and a diode 74 to a junction point 76 and from there to an output terminal 78. The output from opto-switch 34 is also fed through an inverter 80 and a diode 82 to a junction 84 to which an output terminal 86 is joined. The output from opto-switch 38 is fed first through an inverter 88 and a diode 90 to the junction point 84 and also through an inverter 92 to an output terminal 94. The output from opto-switch 32 is fed first through an inverter 96 and a diode 98 to the junction 76 and also through an inverter 100 to an output terminal 102.

OPERATION

In operation, when the touch pad assembly is connected to the DC source and with the switch 62 closed, current will flow through the current limiting resistors 68 to cause the LEDs 66 to emit radiant energy. Assuming that the touch panel is not depressed, each of the photo-transistors 70 will be receiving radiant energy from its associated LED, causing its output to be high. This high signal will be inverted causing all of the output terminals 78, 86, 94 and 102 to be low. Now, with reference to FIG. 1, assume that the operator depresses the left side edge of the touch panel 44 so that the tab 56 enters into the channel 40 of opto-switch 36. Under this condition, the input to inverter 73 will go low, causing a high output to appear at output terminal 78.

Next assume that the touch panel 44 is depressed in its northwest quadrant causing interruption in the radiant energy flow in both opto-switches 36 and 38. As before, the output appearing at junction 78 will go high as will the outputs at terminals 86 and 94. Diodes 74 and 98 work together to isolate the output of inverters 73 and 96 when one is high and as a logical OR circuit such that if either opto-switch 32 or opto-switch 36 is actuated, output terminal 78 will be high. Likewise, diodes 82 and 90 function together to isolate inverters 80 and 88 and as a OR circuit so that if either opto-switch 34 or opto-switch 38 is actuated, output terminal 86 will revert from a low state to a high state.

The device of the present invention is optimally suited for use in a motor control system such as that described in application Ser. No. 144,570, filed concurrently herewith and entitled "MOTOR CONTROL SYSTEM FOR DIRECTING MULTIPLE DEVICES". The motor control chips used in that system require both an enable input signal and a signal indicative of direction for two separate motors, one configured to move a device in the tilt direction and the other to move the device in the pan direction. The signals available at output terminals 78 and 86 in FIG. 3 hereof are the requisite enable signals while those developed at output terminals 94 and 102 are used to indicate the direction (clockwise or counterclockwise) that the motors associated with the tilt and pan directions are to be moved.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can he accomplished without departing from the scope of the invention itself.

What is claimed is:

1. A touch pad for producing differing combinations of binary pulse signals depending upon the location on said pad where manual pressure is applied comprising, in combination:
   (a) a base;
   (b) a printed circuit card affixed to said base, said card having a pattern of electrical conductors and electrical components disposed thereon, said components including a plurality of opto-switches located at predetermined regularly spaced locations about the perimeter of said card, said opto-switches each including a source of radiation and a photo-semiconductor device mounted in spaced relation;
   (c) a planar pad member having a center post and a plurality of tabs projecting downwardly from said pad member at said regularly spaced locations, said post extending through an aperture in said card and flexibly secured to said base for rocking movement relative to said base; and
   (d) resilient spacer means disposed between said card and said pad for normally maintaining said tabs out of the space between said source of radiation and said photosemiconductor device, but allowing a selected one of said tabs to enter said space between said source of radiation and said photosemiconductor device of one or more of said opto-switches to obstruct the flow of radiant energy between said radiation sources and said photosemiconductor devices of one or more opto-switches when manual pressure is applied to said pad member.

2. The touch pad as in claim 1 wherein said opto-switches each include a block-like housing having a grooved channel formed therein between source of radiation and said photosemiconductor device, said block-like housings of said opto-switches being positioned such that when said manual pressure is applied to said pad member, certain of said tabs enter into one or more of said channels.

3. The touch pad as in claim 1 wherein said electrical components further include inverter means coupled to said photosemiconductors of said opto-switches.

4. The touch pad as in claim 3 wherein said pattern of electrical conductors includes an input terminal and a plurality of output terminal, said input terminal being coupled to each of said sources of radiation and to said photosemiconductor device, said output terminals being coupled to individual ones of said inverter means.

5. The touch pad as in claim 1 wherein the flexible attachment of said center post to said base allows said pad member to be rocked 360° in direction.

6. The touch pad as in claim 1 wherein said housing comprises a generally rectangular box having a bottom wall and four mutually perpendicular side walls with a plurality of spaced apart stand-offs for supporting said printed circuit card parallel to said bottom wall and within the confines of said side walls.

7. The touch pad as in claim 6 wherein said pad member is disposed in covering relation to said printed circuit card within the confines of said side walls.

8. The touch pad as in claim 6 wherein said center post includes a threaded bore extending longitudinally inward from the end thereof for receiving a screw fitted through a hole in said bottom wall.

9. The touch pad as in claim 8 and further including a rubber washer disposed on said screw.

10. The touch pad as in claim 1 wherein said resilient spacer means comprise an elastomeric material of a predetermined duromater to determine the force required to operate said touch pad.

* * * * *